(12) United States Patent
Baccouche et al.

(10) Patent No.: US 8,303,030 B2
(45) Date of Patent: Nov. 6, 2012

(54) ENERGY MANAGEMENT STRUCTURE

(75) Inventors: Ridha Baccouche, Ann Arbor, MI (US);
Xiaoming N Chen, Canton, MI (US);
David Anthony Wagner, Northville, MI (US); Michael M Azzouz, Livonia, MI (US); Saeed David Barbat, Novi, MI (US)

(73) Assignee: Ford Global Technologies, Dearborn, MI (US)

( * ) Notice: Subject to any disclaimer, the term of this patent is extended or adjusted under 35 U.S.C. 154(b) by 150 days.

(21) Appl. No.: 12/954,854

(22) Filed: Nov. 27, 2010

(65) Prior Publication Data

US 2012/0133177 A1    May 31, 2012

(51) Int. Cl.
*B60N 99/00* (2006.01)

(52) U.S. Cl. .............................. 296/203.02; 296/203.01

(58) Field of Classification Search ............. 296/203.01, 296/203.02, 204, 205; 293/102, 120
See application file for complete search history.

(56) References Cited

U.S. PATENT DOCUMENTS

| | | | | |
|---|---|---|---|---|
| 1,658,764 | A * | 2/1928 | Finn ................ | 293/120 |
| 1,915,117 | A * | 6/1933 | Baster et al. ............. | 296/203.02 |
| 1,935,447 | A * | 11/1933 | Hoffman ................ | 293/107 |
| 3,034,823 | A * | 5/1962 | Hinka et al. ............ | 296/204 |
| 3,459,004 | A * | 8/1969 | Emilio ................ | 405/215 |
| 3,997,209 | A | 12/1976 | Chika | |
| 4,579,367 | A * | 4/1986 | Manning ................ | 280/784 |
| 5,074,587 | A * | 12/1991 | Schwede et al. ........ | 280/781 |
| 5,466,005 | A * | 11/1995 | Kohlmeier et al. ...... | 280/781 |
| 6,129,410 | A | 10/2000 | Kosaraju et al. | |
| 6,179,355 | B1 * | 1/2001 | Chou et al. ............ | 293/132 |
| 6,328,376 | B2 | 12/2001 | Son | |
| 6,764,119 | B2 * | 7/2004 | Bladow et al. ........... | 293/155 |
| 6,905,138 | B2 * | 6/2005 | Borroni-Bird et al. ..... | 280/783 |
| 7,032,961 | B2 * | 4/2006 | Matsuda ............... | 296/204 |
| 7,059,642 | B2 * | 6/2006 | Ohno et al. ............ | 293/120 |
| 7,401,824 | B2 * | 7/2008 | Condeelis ............. | 293/121 |
| 7,510,234 | B2 | 3/2009 | Ameloot | |
| 7,559,578 | B2 * | 7/2009 | van Leeve et al. ........ | 280/781 |
| 2002/0175538 | A1 * | 11/2002 | Porner ................ | 296/204 |
| 2004/0056469 | A1 | 3/2004 | Karaki et al. | |
| 2005/0046206 | A1 * | 3/2005 | Ohno et al. ............ | 293/120 |
| 2005/0077756 | A1 * | 4/2005 | Matsuda .............. | 296/203.02 |
| 2006/0091700 | A1 | 5/2006 | Decker et al. | |
| 2006/0170205 | A1 * | 8/2006 | Ramsey et al. .......... | 280/789 |
| 2007/0205635 | A1 * | 9/2007 | Bunsmann et al. ........ | 296/204 |

(Continued)

FOREIGN PATENT DOCUMENTS

EP   1991445 B1   7/2009
GB   2448826 A    10/2008

*Primary Examiner* — Lori Lyjak
(74) *Attorney, Agent, or Firm* — Gigette M. Bejin; Raymond Coppiellie

(57) ABSTRACT

An energy management structure for a vehicle may include a first longitudinal rail, a second longitudinal rail joined to the first longitudinal by at least a cross member and a bumper beam. A bumper panel is further provided wherein the bumper panel may be affixed to the bumper beam. The first deflecting rail includes a first front end and a first rear end. The first front end may be affixed to the bumper panel and the first rear end may be affixed to the cross member proximate to the first longitudinal rail. The second deflecting rail includes a second front end and a second rear end. The second front end may be affixed to the bumper panel and the second rear end may be affixed to the cross member proximate to the second longitudinal rail.

17 Claims, 4 Drawing Sheets

U.S. PATENT DOCUMENTS

| | | | |
|---|---|---|---|
| 2007/0257519 A1* | 11/2007 | Hanson et al. | 296/204 |
| 2008/0023954 A1 | 1/2008 | Eichberger et al. | |
| 2009/0309377 A1 | 12/2009 | Welsch | |
| 2010/0078967 A1* | 4/2010 | Boettcher | 296/193.07 |

* cited by examiner

ENERGY MANAGEMENT STRUCTURE

BACKGROUND

The present disclosure relates generally to vehicle structures, and more particularly to an impact energy deflecting and absorption device for a vehicle such as a passenger car, trucks and light vehicles, and cable cars.

The vehicles of the present disclosure have a left and a right longitudinal member. The deflecting device may be arranged in front of a front wheel which protects the front wheel in the event of a collision. An offset frontal collision is to be understood as meaning a frontal collision where the colliding vehicles move toward each other with directional vectors which are substantially parallel but are offset laterally in relation to one another. In vehicles, the front end which does not interface with the left and right longitudinal members constitutes areas which are less rigid than the areas that do interface with the left and right longitudinal members.

U.S. Pat. No. 5,275,436 discloses vertical deflecting plates which are aligned and curved in the horizontal plane such that they positively pivot the wheel inward in the event of a collision. However, these deflecting plates are also constructed in a very heavy manner if they are actually to have this effect, and they likewise require a particularly heavy bumper involving the above-mentioned disadvantages. However, above all, the effect of the front deflecting plate of the '436 patent is inadequate for kinematic reasons. If the front deflecting plate of the '436 patent is arranged at a sufficient distance in front of the wheel and does not extend over the outer vertical boundary surface of the wheel, the outer end of the front deflecting plate pivots inward on a circular arc. The outer end of the front deflecting plate then touches the wheel within the plate's outer vertical boundary surface and can no longer pivot inward. On the contrary, the front deflecting plate destroys the wheel and the deflecting action does not occur.

Furthermore, U.S. Pat. No. 2,519,429 discloses a bumper, on the swept-back parts of which are fixed on the vehicle, deflectors are fitted which are displaceable counter to the force of a tension spring in order to push the vehicle laterally away from the obstacle. From a certain displacement to the rear, the deflectors tip to the rear. In the process, the deflector only bear against a point of the part fixed on the vehicle, and are therefore freely movable and cannot absorb or exert any force. Since the deflector is freely movable, there is no kinematic chain which could cause a wheel, either a wheel of the dedicated vehicle or of its collision counterpart, to turn inward. In addition, in the event of an offset frontal collision, that part of the bumper which is fixed on the vehicle will deform in such a manner that the deflector presses the wheel situated behind the deflector into the vehicle. However, this is precisely such an intrusion which should be prevented.

Finally, U.S. Pat. No. 2,508,836 discloses a bumper, to the parts of which, which are fixed on the vehicle, deflectors which are swept-back toward the front are fitted in order to deflect oncoming bodies. For this purpose, the deflectors are connected displaceably in their longitudinal direction at a point in the vicinity of their outer end to a cross-member 16, which is supported in relation to the vehicle via spring cups, and are connected to one another at their front end. In the event of a collision between the two displaceable supports, the two deflectors are jointly pressed in toward the cross-member 16 and are therefore brought into their extended position and the spring cups are pressed in. The special case of a collision outside one of the two displaceable supports is not provided for and is not discussed.

As light weight members capable of absorbing the high energy of impact forces are applied to the vehicles and the like, columnar energy absorption members may be made of FRP (fiber-reinforced plastic) such as that disclosed in JP10-235763A. These columns are hollow and may be progressively compressed and fail when a compressive force acts in the axial direction of each column to exhibit high energy absorption capability.

SUMMARY

An energy management structure for a vehicle is provided according to the embodiments disclosed herein. The energy management structure may include a first longitudinal rail and a second longitudinal rail joined to the first longitudinal by at least a cross member and a bumper beam. A bumper panel is further provided wherein the bumper panel may be affixed to the bumper beam. A first deflecting rail may be provided where the first deflecting rail has a first front end and a first rear end. The first front end may be affixed to the bumper panel and the first rear end may be affixed to the cross member proximate to the first longitudinal rail. The second deflecting rail includes a second front end and a second rear end. The second front end may be affixed to the bumper panel and the second rear end may be affixed to the cross member proximate to the second longitudinal rail.

BRIEF DESCRIPTION OF THE DRAWINGS

The present invention will now be described by way of example, with reference to the accompanying drawings.

DETAILED DESCRIPTION

Figure 1:
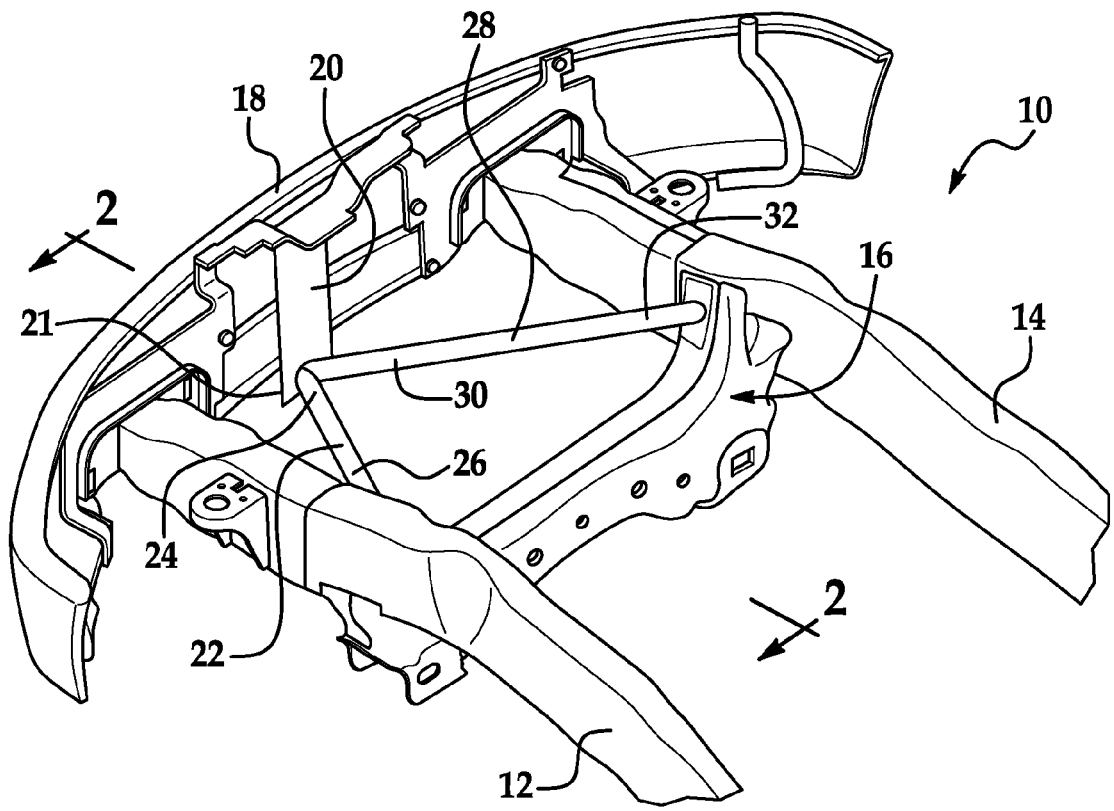
FIG. 1 illustrates a partial, perspective view of the energy management structure for a sport utility vehicle.

Referring now to the drawings wherein like reference numerals are used to identify identical components in the various views, FIG. 1 illustrates a partial, perspective view of the energy management structure 10 for a sport utility vehicle. As shown in FIG. 1, shows a first longitudinal rail 12 and a second longitudinal rail 14 that may constitute a portion of the vehicle frame. The second longitudinal rail 14 may be joined to the first longitudinal by a cross-member 16 and a bumper beam 18 as shown in FIG. 1. The cross-member 16 and the bumper beam 18 may be affixed to the first and second longitudinal rails 12, 14 via mechanical fasteners, welding process, or the like.

A bumper panel 20 is affixed to the bumper beam 18. The bumper panel 20 is operatively configured to reinforce the bumper beam 18 in between the first and second longitudinal rails 12, 14. The bumper panel 20, together with first and second deflecting rails 22, 28, is also operatively configured to assist in transferring loads to the first and second longitudinal rails 12, 14 via the cross-member 16. The bumper panel 20 may be affixed to the bumper beam 18 via mechanical fasteners (not shown) or welding process, and is disposed in a vertical direction as shown in FIG. 1.

As indicated, the first deflecting rail 22 is also provided as shown in FIG. 1. The first deflecting rail 22 includes a first front end 24 and a first rear end 26. The first front end 24 of the first deflecting rail 22 may be affixed to the bumper panel 20. The first rear end 26 of the first deflecting rail 22 may be affixed to the cross-member 16 proximate to the first longitudinal rail 12. It is also to be understood that the first rear end 26 of the first deflecting rail 22 may alternatively be affixed directly to the first longitudinal rail 12.

The second deflecting rail 28 is also provided as shown in FIG. 1. The second deflecting rail 28 includes a second front end 30 and a second rear end 32. Similar to the first deflecting rail 22, the second front end 30 of the second deflecting rail 28 may be affixed to the bumper panel 20. The second rear end 32 of the second deflecting rail 26 may be affixed to the cross-member 16 proximate to the second longitudinal rail 14. It is also to be understood that the second rear end 32 of the second deflecting rail 28 may alternatively be affixed directly to the second longitudinal rail 14.

The cross-member 16 may have a closed section profile which is formed of two open sections welded together to form a closed section. Alternatively, the cross-member 16 may have a closed section profile because it may be a hydro-formed member. The first longitudinal rail 12 and the second longitudinal rail 14 may also each have a closed section profile. Similar to the cross-member 16, the first and second longitudinal rails 12, 14 may each have a closed section profile which is formed of two open sections welded together to form a closed section. Alternatively, the first and second longitudinal rails 12, 14 may have a closed section profile because they may be hydro-formed members.

Figure 2:
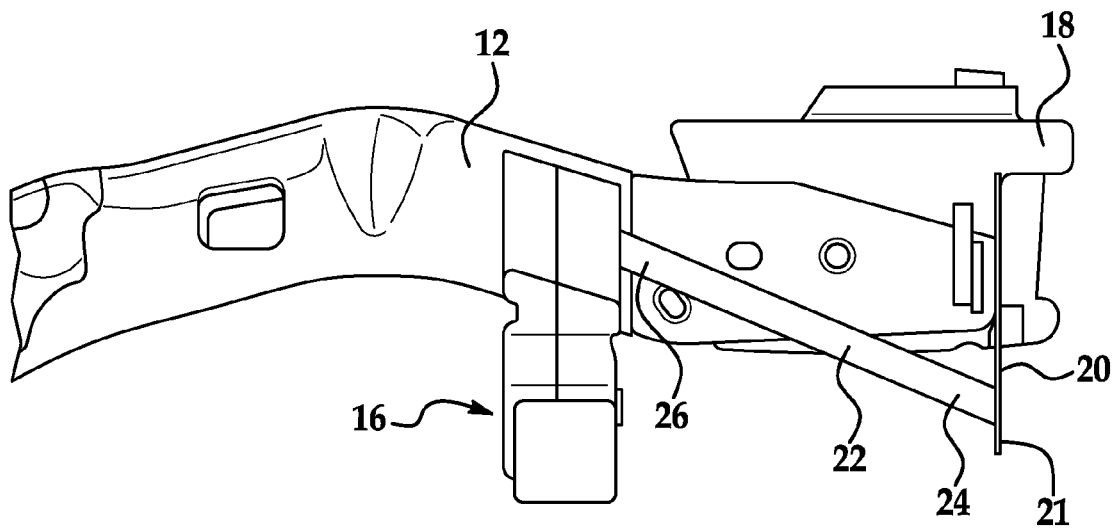
FIG. 2 illustrates a cross-sectional view of the energy management structure along lines A-A of FIG. 1.

Referring now to FIG. 2, a cross-sectional view of the energy management structure 10 is shown along lines A-A of FIG. 1. As shown, the energy management structure 10 of the present disclosure may have the first and second deflecting rails 22, 28 affixed to the bumper panel 20 at the lower portion of the bumper panel 20. This arrangement may be useful in a sport-utility vehicle or truck wherein the vehicle is particularly high off the ground relative to sedans. Under this arrangement, the first and second deflecting rails 22, 28 are better positioned to transfer energy in the event of a collision between the truck and a sedan. The first and second energy deflecting rails are disposed at an angle so that the first and second energy deflecting rails transfer/absorb energy between the first and second longitudinal rails 12, 14 as well as below the front bumper. Accordingly, energy may be transferred to the cross-member 16 and/or the first and second longitudinal rails 12, 14.

Figure 3:
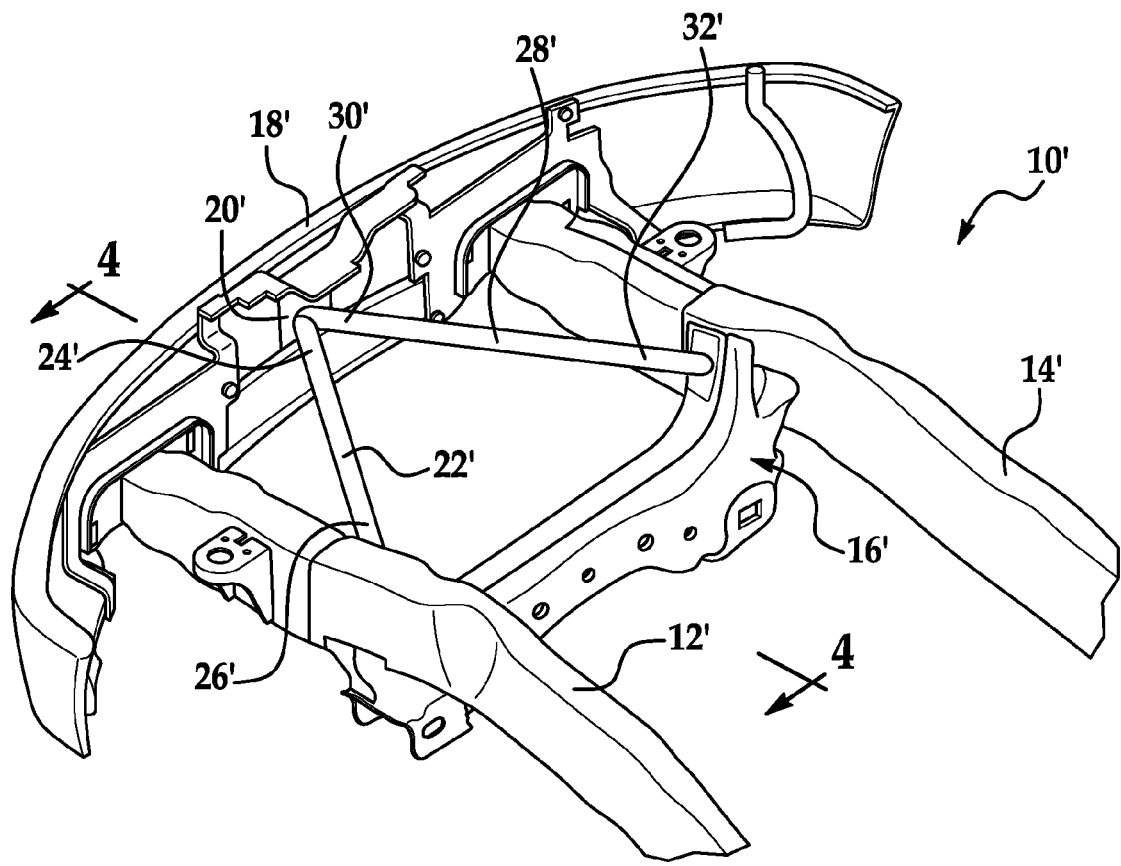
FIG. 3 illustrates a partial, perspective view of the energy management structure for a sedan.
Figure 4:
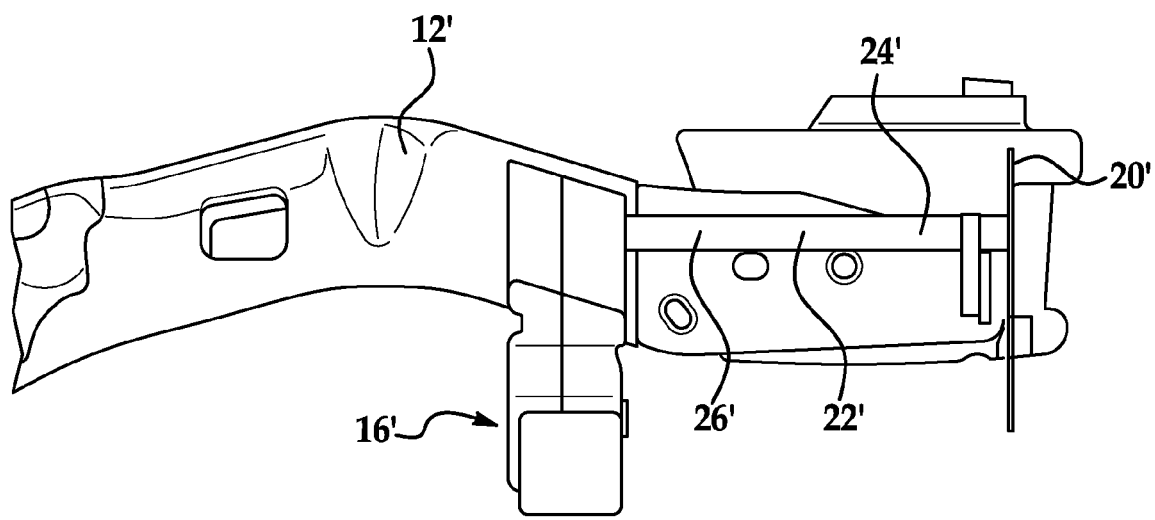
FIG. 4 illustrates a cross-sectional view of the energy management structure along lines 4-4 of FIG. 3.

Referring now to FIG. 3 of the present disclosure, a partial, perspective view of a second embodiment of the energy management system 10' present disclosure is shown in a sedan vehicle structure. FIG. 4 illustrates a cross sectional view along lines B-B of FIG. 3. As shown, the first and second deflecting rails 22', 28' are in a substantially horizontal position. The bumper panel 20' of this second embodiment does not extend below the bumper beam 18' given that any impact incurred in this type of vehicle is likely to occur directly at the bumper beam 18'. The bumper panel 20' of the second embodiment may be affixed to the bumper beam 18' via mechanical fasteners (not shown), welding or the like. It is also to be understood that the bumper panel 20' may also be integrally formed with the bumper beam 18'. The bumper panel 20' may generally be positioned between the first and second longitudinal rails 12', 14' as shown in FIG. 3.

As shown in FIGS. 3 and 4, the first deflecting rail 22' includes a first front end 24' and a first rear end 26' and the second deflecting rail 28' includes a second front end 30' and a second rear end 32'. The first front end 24' and the second front end 30' may be affixed to the bumper panel 20' via mechanical fasteners (not shown) or a welding process. The first rear end 26' and the second rear end 32' may be affixed to the cross-member 16', or to first and second longitudinal rails 12', 14' respectively. Under this arrangement, the first and second deflecting rails 22', 28' are operatively configured to transfer loads incurred at the bumper beam 18' (between the first and second longitudinal rails 12', 14') to the cross-member 16' and/or the first and second longitudinal rails 12', 14'.

Figure 5:
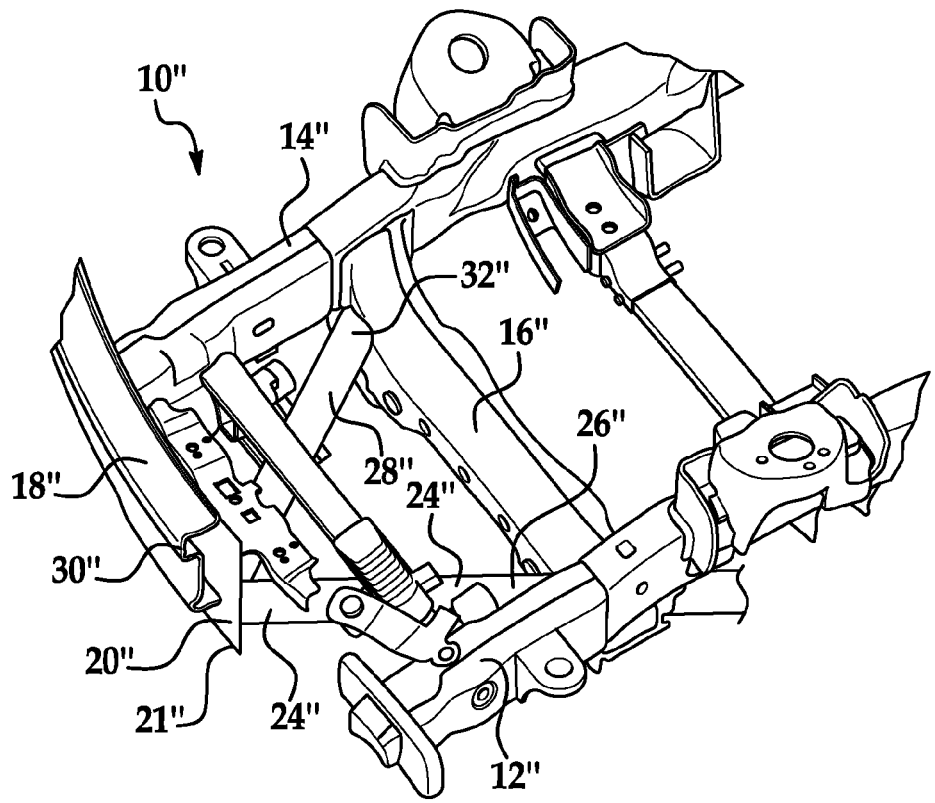
FIG. 5 illustrates a partial, perspective view of the energy management structure for a sport utility vehicle.

Referring now to FIG. 5, a third embodiment of the present disclosure is shown wherein the first and second deflecting rails 22", 28" are operatively configured to both absorb and deflect energy in the event a load is applied to the bumper beam 18" between the first and second longitudinal rails 12", 14". As shown in FIG. 5, the third embodiment is shown wherein the energy management structure 10" is implemented in a sport utility vehicle environment. The first longitudinal rail 12" and a second longitudinal rail 14" that may constitute a portion of the vehicle frame. The second longitudinal rail 14'" may be joined to the first longitudinal by a cross-member 16" and a bumper beam 18" as shown. The cross-member 16" and the bumper beam 18" may be affixed to the first and second longitudinal rails 12", 14" via mechanical fasteners, welding process, or the like.

Figure 6:
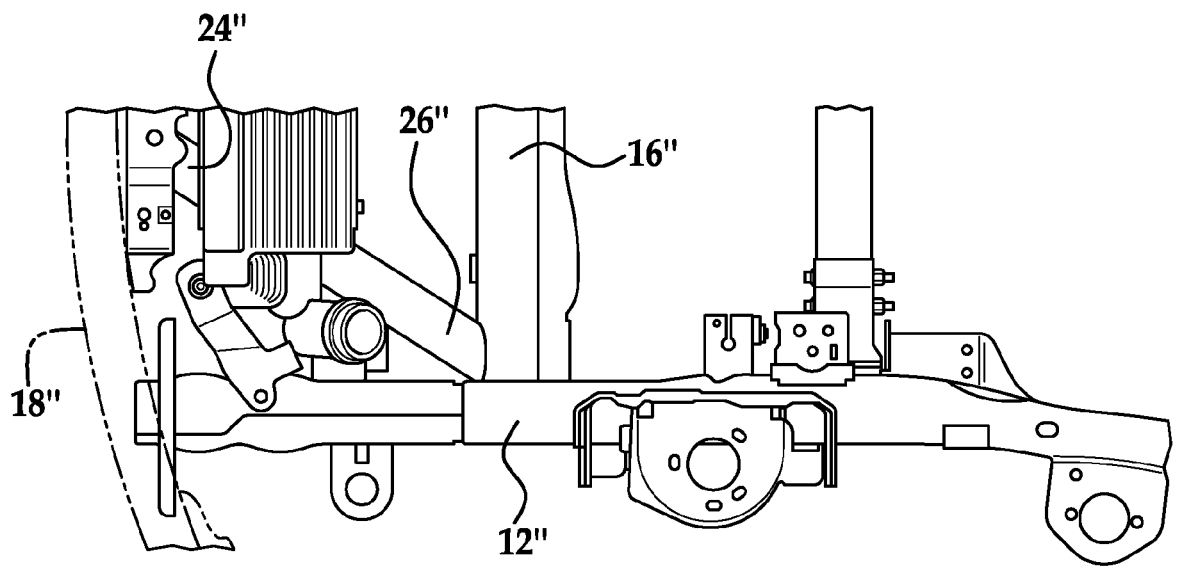
FIG. 6 illustrates a partial top view of FIG. 5.

As shown in FIG. 5, a bumper panel 20" is affixed to the bumper beam 18". The bumper panel 20" is operatively configured to reinforce the bumper beam 18" in between the first and second longitudinal rails 12", 14". With reference to FIG. 6, a top half view of the energy management system 10" is shown. Similar to the first embodiment of the present disclosure, the third embodiment of the present disclosure includes a bumper panel 20" which has a lower portion 21" that extends below the bumper beam 18". The lower portion 21" of the bumper panel 20" is operatively configured to interface with sedan type vehicles in the event of a collision. The first and second deflecting rails 22", 28" are further designed to absorb energy as well as deflect energy towards the cross-member 16", the first longitudinal rail 12" and the second longitudinal rail 14" when a load is applied to the bumper panel 20".

The first deflecting rail 22" includes a first front end 24" and a first rear end 26". The first front end 24" of the first deflecting rail 22" may be affixed to the bumper panel 20". The first rear end 26" of the first deflecting rail 22" may be affixed to the cross-member 16" proximate to the first longitudinal rail 12". It is also to be understood that the first rear end 26" of the first deflecting rail 22" may alternatively be affixed directly to the first longitudinal rail 12".

The second deflecting rail 28" is also provided as shown in FIG. 5. The second deflecting rail 28" includes a second front end 30" and a second rear end 32". Similar to the first deflecting rail 22", the second front end 30" of the second deflecting rail 28" may be affixed to the bumper panel 20". The second rear end 32" of the second deflecting rail 28" may be affixed to the cross-member 16" proximate to the second longitudinal rail 14". It is also to be understood that the second rear end 32" of the second deflecting rail 28" may alternatively be affixed, directly to the second longitudinal rail 14". As shown in FIGS. 5 and 6, the first and second deflecting rails 22", 28" are positioned between the lower portion 21" of the bumper panel 20" and the cross member 16" such that the first and second deflecting rails 22", 28" are at an angle. The first and second deflecting rails 22", 28" are further configured to absorb energy and deflect energy towards the cross-member 16", the first longitudinal rail 12" and the second longitudinal rail 14" in the event of an impact to the bumper beam 18" (between the first and second longitudinal rails 12", 14").

The cross-member 16" may have a closed section profile which is formed of two open sections welded together to form a closed section. Alternatively, the cross-member 16" may have a closed section profile because it may be a hydro-formed member. The first longitudinal rail 12" and the second longitudinal rail 14" may also each have a closed section profile. Similar to the cross-member 16", the first and second longitudinal rails 12", 14" may each have a closed section profile which is formed of two open sections welded together to form a closed section. Alternatively, the first and second longitudinal rails 12", 14" may have a closed section profile because they may be hydro-formed members.

Figure 7:
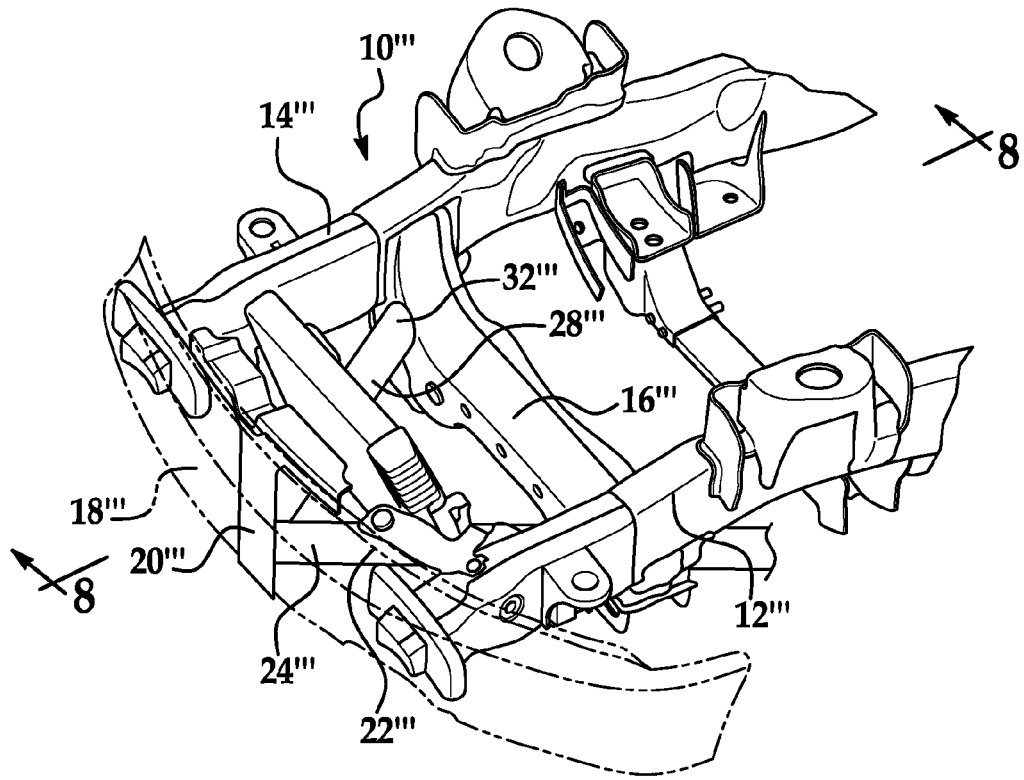
FIG. 7 illustrates a perspective view of the energy management structure for a sedan.
Figure 8:
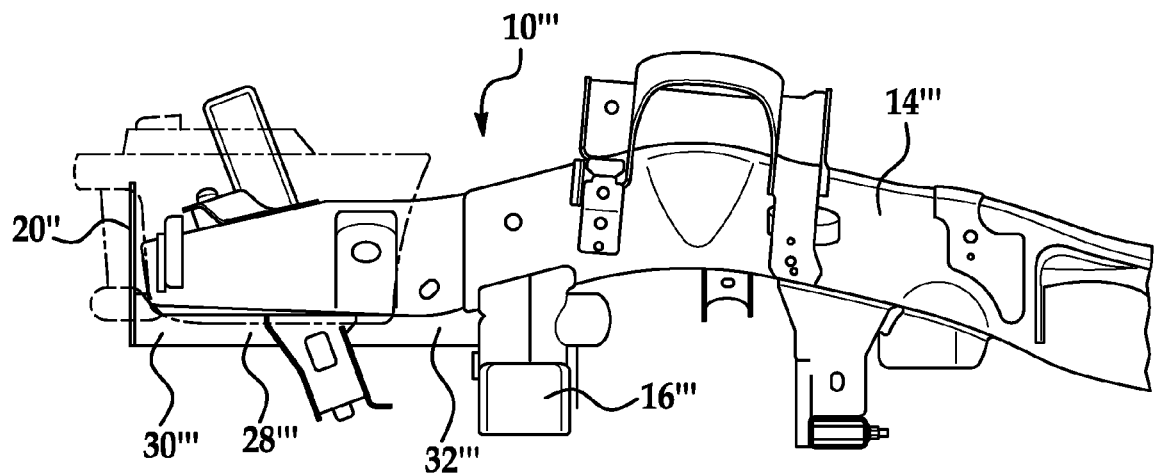
FIG. 8 illustrates a cross-sectional view of the energy management structure along lines 8-8 of FIG. 7.

With reference now to FIGS. 7 and 8, a fourth embodiment of the present disclosure is shown. FIG. 7 illustrates a partial, perspective view of the energy management system 10''' for a sedan. FIG. 8 illustrates a cross-sectional view of the energy management system 10''' along lines D-D of FIG. 7. The first longitudinal rail 12''' and the second longitudinal rail 14''' that may constitute a portion of the vehicle frame. The second longitudinal rail 14''' may be joined to the first longitudinal rail 12''' by a cross-member 16''' and a bumper beam 18''' as shown in FIG. 7. The cross-member 16''' and the bumper beam 18''' may be affixed to the first and second longitudinal rails 12''', 14''' via mechanical fasteners (not shown), welding process, or the like.

As shown in FIG. 7, a bumper panel 20''' may be affixed to the bumper beam 18'''. The bumper panel 20''' is operatively configured to reinforce the bumper beam 18''' in between the first and second longitudinal rails 12''', 14'''. As indicated, the first deflecting rail 22''' is also provided as shown in FIG. 7. The first deflecting rail 22''' includes a first front end 24''' and a first rear end 26". The first front end 24''' of the first deflecting rail 22''' may be affixed to the bumper panel 20'''. The first rear end 26''' of the first deflecting rail 22''' may be affixed to the cross-member 16''' proximate to the first longitudinal rail 12". It is also to be understood that the first rear end 26''' of the first deflecting rail 22''' may alternatively be affixed directly to the first longitudinal rail 12'''.

The second deflecting rail 28''' is also provided as shown in FIG. 7. The second deflecting rail 28''' includes a second front end 30''' and a second rear end 32'''. Similar to the first deflecting rail 22''', the second front end 30''' of the second deflecting rail 28''' may be affixed to the bumper panel 20'''. The second rear end 32''' of the second deflecting rail 28''' may be affixed to the cross-member 16''' proximate to the second longitudinal rail 14'''. It is also to be understood that the second rear end 32''' of the second deflecting rail 28''' may alternatively be affixed directly to the second longitudinal rail 14'''. As shown in FIGS. 7 and 8, the first and second deflecting rails 22''', 28''' are substantially horizontal, and are further configured to absorb energy and deflect energy towards the cross-member 16''', the first longitudinal rail 12''' and the second longitudinal rail 14''' in the event of an impact to the bumper beam 18''' (between the first and second longitudinal rails 12''', 14''').

The cross-member 16''' may have a closed section profile which is formed of two open sections welded together to form a closed section. Alternatively, the cross-member 16''' may have a closed section profile because it may be a hydro-formed member. The first longitudinal rail 12''' and the second longitudinal rail 14''' may also each have a closed section profile. Similar to the cross-member 16, the first and second longitudinal rails 12''', 14''' may each have a closed section profile which is formed of two open sections welded together to form a closed section. Alternatively, the first and second longitudinal rails 12''', 14''' may have a closed section profile because they may be hydro-formed members.

It will be appreciated by those skilled in the art that, although the invention has been described with reference to one or more preferred embodiments, the invention is not limited to these disclosed embodiments and that various alternative embodiments or modifications to the disclosed embodiments could be made without departing from the scope of the invention.

What is claimed is:

1. An energy management structure for a vehicle, the energy management structure comprising:
    a first longitudinal rail;
    a second longitudinal rail joined to the first longitudinal rail by at least a cross member and a bumper beam;
    a bumper panel affixed to the bumper beam;
    a first deflecting rail having a first front end and a first rear end, the first front end being affixed to the bumper panel and the first rear end being affixed to the cross member proximate to the first longitudinal rail, and the first deflecting rail operatively configured to transfer loads from the bumper beam to the cross member; and
    a second deflecting rail having a second front end and a second rear end, the second front end being affixed to the bumper panel and the second rear end being affixed to the cross member proximate to the second longitudinal rail.

2. The energy management structure as defined in claim 1 wherein the cross member has a closed section profile.

3. The energy management structure as defined in claim 1 wherein the first longitudinal rail and the second longitudinal rail each have a closed section profile.

4. The energy management structure as defined in claim 1 wherein the first and second deflecting rails are affixed to the bumper panel at a lower portion of the bumper panel.

5. The energy management structure as defined in claim 1 wherein the first and second deflecting rails are affixed to the bumper panel at a middle portion of the bumper panel.

6. The energy management structure as defined in claim 5 wherein the first and second deflecting rails are substantially horizontal.

7. The energy management structure as defined in claim 4 wherein the first and second deflecting rails are disposed on an angle between the bumper panel and the cross member.

8. The energy management structure as defined in claim 1 wherein the bumper panel is disposed on the bumper beam between the first and the second longitudinal rails.

9. An energy management structure for a vehicle, the energy management structure comprising:
    a first longitudinal rail;
    a second longitudinal rail joined to the first longitudinal rail by at least a cross member and a bumper beam;
    a bumper panel affixed to the bumper beam, the bumper panel having an upper portion, a middle portion, and a lower portion extending below the bumper beam;
    a first deflecting rail having a first front end and a first rear end, the first front end being affixed to the lower portion of the bumper panel and the first rear end being affixed to the cross member proximate to the first longitudinal rail, and the first deflecting rail operatively configured to transfer loads from the bumper panel to the cross member; and
    a second deflecting rail having a second front end and a second rear end, the second front end being affixed to the bumper panel and the second rear end being affixed to the cross member proximate to the second longitudinal rail.

10. An energy management structure for a vehicle comprising:
a first longitudinal rail;
a second longitudinal rail joined to the first longitudinal rail by at least a cross member and a bumper beam;
a bumper panel affixed to the bumper beam;
a first deflecting rail having a first front end and a first rear end, the first front end being affixed to the lower portion of the bumper panel and the first rear end being affixed to the first longitudinal rail, and the first deflecting rail operatively configured to absorb energy and transfer loads from the bumper beam to the first longitudinal rail; and
a second deflecting rail having a second front end and a second rear end, the second front end being affixed to the bumper panel and the second rear end being affixed to the second longitudinal rail, and the second deflecting rail operatively configured to absorb energy and transfer loads from the bumper beam to the second longitudinal rail.

11. The energy management structure as defined in claim 10 wherein the cross member has a closed section profile.

12. The energy management structure as defined in claim 10 wherein the first longitudinal rail and the second longitudinal rail each have a closed section profile.

13. The energy management structure as defined in claim 10 wherein the first and second deflecting rails are affixed to the bumper panel at a lower portion of the bumper panel.

14. The energy management structure as defined in claim 10 wherein the first and second deflecting rails are affixed to the bumper panel at a middle portion of the bumper panel.

15. The energy management structure as defined in claim 14 wherein the first and second deflecting rails are substantially horizontal.

16. The energy management structure as defined in claim 13 wherein the first and second deflecting rails are disposed on an angle between the bumper panel and the cross member.

17. The energy management structure as defined in claim 10 wherein the bumper panel is affixed to the bumper beam between the first and the second longitudinal rails.

* * * * *